No. 743,420. PATENTED NOV. 10, 1903.
A. ARNESEN.
ANIMAL TRAP.
APPLICATION FILED NOV. 19, 1902.
NO MODEL.
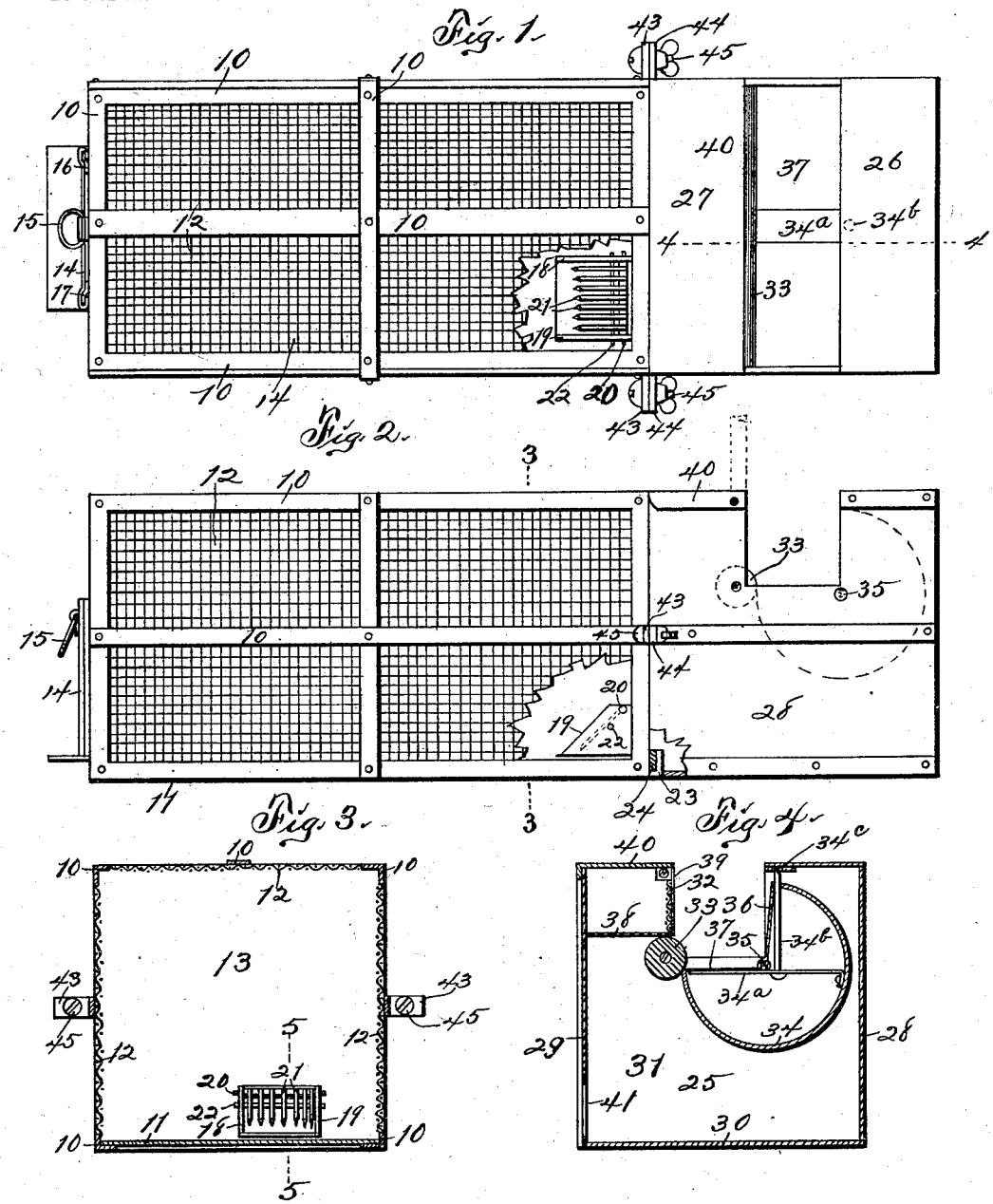

No. 743,420. Patented November 10, 1903.

UNITED STATES PATENT OFFICE.

ANDREW ARNESEN, OF DES MOINES, IOWA.

ANIMAL-TRAP.

SPECIFICATION forming part of Letters Patent No. 743,420, dated November 10, 1903.

Application filed November 19, 1902. Serial No. 131,944. (No model.)

*To all whom it may concern:*

Be it known that I, ANDREW ARNESEN, a citizen of the United States of America, and a resident of Des Moines, Polk county, Iowa, have invented a new and useful Animal-Trap, of which the following is a specification.

The object of this invention is to provide an improved animal-trap of simple construction and efficient in operation.

My invention consists in the construction, arrangement, and combination of elements hereinafter set forth, pointed out in my claims, and illustrated by the accompanying drawings, in which—

Figure 1 is a plan of top view of the trap, a portion of the cover thereof being broken away to reveal interior construction. Fig. 2 is a side elevation of the trap, a portion of one side wall being broken away to reveal interior construction. Fig. 3 is a cross-section of the trap on the indicated line 3 3 of Fig. 2. Fig. 4 is a cross-section of the trap on the indicated line 4 4 of Fig. 1.

In the construction of the device as shown an assembly chamber or cage is provided and formed of metallic bars 10, arranged to produce a skeleton frame of rigid construction, a bottom 11, connected to said frame-bars, and walls formed for the most part of wire mesh 12. The cage preferably is substantially rectangular in form and inclosed by an imperforate bottom 11 and the wire-mesh top and side walls. One end of the cage, as shown in Fig. 3, is formed by an imperforate plate 13, rigidly mounted. The opposite end wall of the cage is formed of a metal plate having an aperture or doorway therein, and a door 14, provided with a handle or loop 15, is mounted for vertical reciprocation across said aperture or doorway. The door 14 preferably is made of sheet metal, with its side margins turned backward and inward to overlap, engage, and slide upon cleats 16 17, fixed to the end wall. A notch is formed in one of the lower corners of the plate 13, forming an end wall of the cage, and wings 18 19 are formed on said end wall and extend inward therefrom in parallel planes. A rod 20 is mounted horizontally in the upper forward portions of the wings 18 19, and spikes 21 are pivoted at one end on said rod and extend downward and forward therefrom. A rod 22 is mounted in a horizontal position in the wings 18 19 below the plane of the rod 20 and serves to support all of the spikes 21 normally in oblique planes between said wings. The spikes 21 have their forward lower ends beveled downward and attenuated and spaced apart slightly from the bottom 11 of the cage. The notch in the end plate 13, guarded by the spikes 21, forms the initial or entrance port or doorway for the cage, and the door 14 controls the egress or departure port or doorway of the cage. Hooks 23, one only of which is shown, Fig. 2, are formed on and extend outward and upward from that end of the cage carrying the plate 13 and are arranged to engage and embrace a cross-bar 24 on and forming part of a trap-section. The trap-section is formed of metal bars 24 and 25, rigidly connected in skeleton frame and closed in part by plates 26 27 28 29, a bottom 30, and an end wall 31 and in part by wire mesh 32. A trap-cylinder 34 is provided, preferably formed of sheet metal and comprising end pieces connected by a rim portion and pivoted on a shaft 35, mounted in the sides of the trap-section. The trap-cylinder 34 has its end portions formed with quadrant-notches, and approximately one-fourth of its rim's portion is cut away, thus forming a notch or recess approximating in capacity to one-fourth the size of the cylinder. Trap-plates 36 37 are mounted in the notches of the end plates of the trap-cylinder 34 at right angles to each other and are secured at their inner margins to each other and to the shaft or rod 35 and at their outer margins to the plane margins of the rim portion of the trap-cylinder. A plate 38 is mounted horizontally in the trap-section approximately midway between the bottom 30 and wire mesh 32 and projects inward from the wall-plate 29 nearly to one margin of the rim portion of the trap-cylinder and the outer margin of the trap-plate 37. The plate 38 forms the bottom of a bait chamber or box. A roller 33 is journaled at the inner edge of the plate 38, parallel with the axis of the trap-cylinder, and intersects the rim of said cylinder, and the relation of the roller to the notched portion of the trap-cylinder is such that said cylinder is limited by contact with the roller to one-fourth of one revolution at each actuation thereof. A partition 39 or meshwork is mounted vertically on the inner marginal portion of the plate 38 and rises therefrom to the top of the trap-section. The partition 39 forms the inner wall of the bait chamber or box of the trap-section, and a hinged plate 40 forms the top of said bait-chamber. The entrance to the trap-section is above the trap-plate 37 and between the normal position of the trap-plate 36 and the plate or partition 39. Bars 43 44 are mounted on the trap-section and cage, respectively, and are connected by bolts 45 45 and nuts, thus forming a connection between said cage and trap-section auxiliary to the connection provided by the interlocking hooks 23 and cross-bar 24. That end of the trap-section adjacent the cage is formed with an opening 41, thus providing free communication from the space below the plate 37 to the interior of the cage through the notch in the end plate 13 controlled by the spikes 21. The trap-plate 37 is cut away at its center, and a trigger-plate $34^a$ rests in the opening thus formed and extends transversely of said trap-plate and extends across the trap-cylinder 34 and is fixed at one end for oscillation diametrically of said cylinder. A pin $34^b$ is mounted on and projects upward from the central portion of the trigger-plate $34^a$ through the periphery of the trap-cylinder 34, adjacent the plate 36, and enters a seat $34^c$, formed in the top of the trap-section. One end of the pin $34^b$ is beveled to ride under the top of the trap-section.

To set the trap, the door 14 is closed and bait is supplied to the bait-chamber. An animal approaching the trap will scent the bait through the mesh 32 and will investigate and seek to obtain said bait. In its investigations the animal will mount the top of the trap-section and follow the approach and travel upon the trap-plate 37, since its observation teaches it that by this means only can access be had to the bait through the meshes of the partition 39. The weight of the animal when applied to the trigger-plate $34^a$ of the trap-plate 37 releases the pin from the seat $34^c$, unlocks the trap-cylinder, greatly overbalances the counterpoise of the trap-cylinder, and precipitates the animal into the space below the plate 38. In the forward rotation of the trap-cylinder 34 and the discharge of the animal into the space below the plate 38 the trap-plate 36 closely follows the animal and prevents a successful upward leap to freedom. The roller 33 serves the useful function of an insecure and revoluble footing for the animal in its efforts to escape from the trap-plate 37. Upon the deposit of the animal in the trap-chamber below the plate 38 the cylinder repositions by gravity and the pin $34^b$ reënters the seat $34^c$ and locks the trap-cylinder reset for the entrance of another animal. The animal cannot open an exit by way of the trap-cylinder because of the interengagement of the pin $34^b$ and seat $34^c$. Hence the animal is impelled to seek escape by some other route, and the only escape provided is through the notch in the end plate 13, controlled by the spikes 21. In making its escape through the notch in the end plate 13 the animal lifts one or another or several of the spikes 21, as illustrated in Fig. 5, and having lifted and passed one or another or several of said spikes, even with a portion of its body, the animal may not return, owing to the inclined positioning and beveled attenuated extremities of said spikes. A considerable number of animals may be admitted successively, as above described, and retained indefinitely in the cage pending their removal through the exit-opening controlled by the door 14. The exit-opening controlled by the door 14 is of such size as will admit a hunting-animal, such as a ferret or rat-dog, for the purpose of killing the animal trapped in the cage.

I claim as my invention—

1. An animal-trap, comprising the casing, a trap-cylinder mounted for oscillation in the casing, ends of said trap-cylinder notched and trap-plates mounted longitudinally of the cylinder and fixed to said notched ends at right angles to each other, one of said trap-plates cut away at and transversely of its center, a trigger-plate resting in the notch thus formed and arranged for oscillation, a trigger on said plate and a lug on the casing normally engaged by said trigger, together with a bait-chamber and a meshed partition between said bait-chamber and the cylinder, whereby an animal seeking access through said meshed partition may depress said trigger-plate and release the trap-cylinder for rotation.

2. An animal-trap comprising the cage, the trap-section communicating with said cage, means for controlling the port of communication between the trap-section and cage, a trap-cylinder mounted for oscillation in the trap-section, ends of said trap-cylinder notched and trap-plates mounted longitudinally of the cylinder and fixed to said notched ends at right angles to each other, one of said trap-plates being cut away at its center, a trigger-plate resting in the notch thus formed and arranged for oscillation, a trigger on said plate and a lug on the trap-section normally engaged by said trigger, together with a bait-chamber and a meshed partition between said bait-chamber and the trap-cylinder, whereby an animal seeking access through said meshed partition may depress said trigger-plate and release the trap-cylinder for rotation.

Signed by me at Des Moines, Iowa, this 14th day of May, 1902.

ANDREW ARNESEN.

Witnesses:
S. C. SWEET,
AMY B. PRIOR.